US011471248B2

(12) United States Patent
Tajbakhsh (10) Patent No.: US 11,471,248 B2
(45) Date of Patent: Oct. 18, 2022

(54) INTERPROXIMAL POLISHING BUR (71) Applicant: Sharareh Tajbakhsh, San Jose, CA (US)

(72) Inventor: Sharareh Tajbakhsh, San Jose, CA (US)

(*) Notice: Subject to any disclaimer, the term of this patent is extended or adjusted under 35 U.S.C. 154(b) by 135 days.

(21) Appl. No.: 16/513,704

(22) Filed: Jul. 17, 2019

(65) Prior Publication Data
US 2020/0022782 A1 Jan. 23, 2020

Related U.S. Application Data (60) Provisional application No. 62/725,108, filed on Aug. 30, 2018, provisional application No. 62/700,802, filed on Jul. 19, 2018.

(51) Int. Cl.
*A61C 3/06* (2006.01)

(52) U.S. Cl.
CPC ..................... *A61C 3/06* (2013.01)

(58) Field of Classification Search
CPC .. A61C 3/02; A61C 3/025; A61C 3/03; A61C 3/06; A61C 17/00; A61C 17/16; A61C 17/18; B23C 2210/326
(Continued)

(56) References Cited

U.S. PATENT DOCUMENTS

| 170,178 A | * | 11/1875 | Locke | .................. | B24D 15/023 |
| | | | | | 451/512 |
| 999,964 A | * | 8/1911 | Coney | ...................... | A61C 3/06 |
| | | | | | 433/135 |

(Continued)

FOREIGN PATENT DOCUMENTS

| EP | 2564803 A1 * | 3/2013 | ............... A61C 3/06 |
| JP | 3425439 B1 * | 7/2003 | ............... A61C 3/06 |

(Continued)

OTHER PUBLICATIONS

Archive of "Brasseler USA Dental Instrumentation: Dialite Intra-Oral Porcelain Polishing Paste," www.brasselerusadental.com, 2016, nine pages, [Online] [Archived by http://archive.org on Aug. 11, 2016; Retrieved on Jun. 10, 2021 ] Retrieved from the internet <URL: https://web.archive.org/web/20160811050329/https://brasselerusadental.com/productcategory/products/page/3/>.

(Continued)

*Primary Examiner* — Matthew M Nelson
(74) *Attorney, Agent, or Firm* — Fenwick & West LLP (57) ABSTRACT A slender polishing tip is disclosed. In one example, it is an interproximal polishing bur, which is a dental instrument that is a small bit used in a high-speed handpiece by a dentist to perform dental work on the teeth of a patient. It smooths the adjacent tooth or restoration. An adjacent tooth may inadvertently become nicked by the high-speed handpiece while working on a tooth, leaving the adjacent surface roughened. This roughened surface will attract more bacteria and can be harmful to the health of the dentition. Presently, there are no such burs slender enough to fit into the small space available between the prepared tooth and the adjacent tooth to allow appropriate smoothing. The interproximal polishing bur described is small and slender with a particular shape designed to re-finish and re-polish the surfaces of an adjacent gold crown, porcelain crown, and natural dentition.

20 Claims, 10 Drawing Sheets (58) Field of Classification Search
USPC .................................. 433/141, 142, 165, 166
See application file for complete search history.

(56) References Cited

U.S. PATENT DOCUMENTS

| | | | | | |
|---|---|---|---|---|---|
| 2,347,741 | A | * | 5/1944 | Hobday | A61C 3/06 433/127 |
| 3,894,339 | A | * | 7/1975 | Manzi | A61C 3/06 433/166 |
| 4,178,689 | A | * | 12/1979 | Nash | A61C 3/06 451/541 |
| 4,522,595 | A | * | 6/1985 | Selvidge | A61C 15/00 132/329 |
| 4,636,171 | A | * | 1/1987 | Martin | A61C 3/06 433/134 |
| 4,830,615 | A | * | 5/1989 | Goldstein | A61C 3/06 433/229 |
| 5,211,560 | A | * | 5/1993 | Lowder | A61C 3/06 433/142 |
| 5,882,201 | A | * | 3/1999 | Salem | A61C 3/06 433/216 |
| 2002/0037490 | A1 | * | 3/2002 | Oyamada | A61C 3/02 433/165 |
| 2003/0181154 | A1 | * | 9/2003 | Fischer | A61C 3/06 451/532 |
| 2006/0105293 | A1 | * | 5/2006 | Funato | A61C 3/02 433/165 |
| 2007/0101797 | A1 | * | 5/2007 | Quan | A61C 5/42 72/416 |
| 2013/0052612 | A1 | * | 2/2013 | Smailus | A61C 3/06 433/142 |
| 2017/0245958 | A1 | * | 8/2017 | Smail | A61C 3/02 |
| 2020/0022782 | A1 | * | 1/2020 | Tajbakhsh | A61C 3/06 |

FOREIGN PATENT DOCUMENTS

| | | | | | |
|---|---|---|---|---|---|
| KR | 20130035345 | A | * | 4/2013 | A61C 3/06 |
| WO | WO-2021038438 | A1 | * | 3/2021 | A61C 3/02 |

OTHER PUBLICATIONS

Archive of "Microcopy: NeoDiamond," Microcopy, 2017, 25 pages [Online] [Archived by http://archive.org on Mar. 19, 2017; Retrieved on Jun. 10, 2021] Retrieved from the internet <URL: https://web.archive.org/web/20170319171330/https://microcopydental.com/neodiamond>.

Archive of "Universal Dental (PVT) Ltd.: Politip (Ivoclar Vivadent)," universaldental.com, 2 pages, [Online] [Archived by http://archive.org on Mar. 8, 2018; Retrieved on Jun. 10, 2021] Retrieved from the Internet<URL: https://web.archive.org/web/20180328091708/http://www.universaldental.com.pk/ProductDetails.aspx?val=70>.

* cited by examiner

INTERPROXIMAL POLISHING BUR

CROSS REFERENCE TO RELATED APPLICATIONS

This application claims the benefit of U.S. Provisional Application No. 62/700,802, filed on Jul. 19, 2018 and U.S. Provisional Application No. 62/725,108, filed on Aug. 30, 2018, each of which is hereby incorporated by reference in its entirety.

BACKGROUND

Field of Invention

This invention relates generally to the field polishing devices, and particularly to an interproximal finishing or polishing bur for use in dentistry.

Description of the Related Art

Devices for use in finishing and/or polishing surfaces sometimes must be able to fit into small spaces for work performed in a crevice between two objects. As one example, polishing instruments are commonly used in dentistry to finish and/or polish surfaces in between teeth. When a patient is having a procedure that involves placement of a crown on a tooth, the tooth must be prepared for the crown. This process involves using an instrument, such as a handpiece having a high-speed tip composed of an abrasive material (e.g., diamond coated), to file down the tooth to reduce its size such that the crown can fit over the entire tooth. During this process, the adjacent tooth may inadvertently become nicked by the high-speed handpiece while working on the tooth that is being prepared for the crown, leaving the adjacent surface roughened. This roughened surface will attract more bacteria and can be harmful to the health of the dentition.

To address this problem after the procedures, the dentist polishes the teeth with a polishing instrument including a high-speed polishing tip on a handpiece. This removes or polishes away the roughened surface such that the surfaces of the teeth adjacent to the new crown are smooth. Presently, there are no polishing tips slender enough to fit into the small space available between the new crown and the adjacent tooth. As a result, the dentist is forced to try to force a tip that is too wide in between teeth, possibly causing damage to teeth/gums, or discomfort for the patient. Alternatively, the dentist must try to manually shave down the surface of the tip with a sharp instrument to allow it to fit between the teeth. This is time-consuming and not very effective, as the manually shaved tip is often still not well-shaped to fit between teeth. It can also be can be uneven after the shaving (possibly causing uneven polishing), and may not operate as well, among other issues.

SUMMARY

A polishing instrument is used for polishing certain metals and is shaped to fit into a narrow space. In one embodiment, the polishing instrument includes an interproximal finishing or polishing bur or bit used for the practice of dentistry, though the bur can alternatively be used in any field in which finishing is performed on a metal or other material that is polished, such as for jewelry making. In the example in which the instrument is a dental interproximal polishing bur, the instrument may be a small bit that is removably attachable to a high-speed handpiece used by a dentist or other dental provider to perform dental work on a tooth. The purpose of the bur is to smooth the adjacent restoration at the time of the preparation of a tooth. As stated above, an adjacent tooth may inadvertently become nicked by the high-speed handpiece while working on a tooth, leaving the adjacent surface roughened. This roughened surface will attract more bacteria and can be harmful to the health of the dentition.

Conventional burs available today are not designed to fit in the crevice between teeth. In the dental field, the burs are bulbous or a variety of other shapes that are wider than the width between a prepared tooth with a crown and an adjacent tooth. The polishing instrument described here, however, is slender enough to fit between the prepared tooth with the new crown and an adjacent tooth (or previously existing crown on an adjacent tooth) to re-finish and re-polish the surfaces of the adjacent tooth/crown. It can polish an adjacent gold crown, porcelain crown, or natural dentition. The polishing instrument removes the step conducted by dentists today of manually cutting/shaving down the conventional polishers until they are able to squeeze into the interproximal space between teeth. The polishing instrument is specifically designed and shaped to fit into the crevice between teeth without requiring manual modification. Yet, it is built as a sturdy instrument with a shank running through the center that reinforces the slender design such that it will not break or bend while being inserted into the interproximal space.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A polishing bur is described throughout that can be used to polish various different surfaces, especially for fine polishing of small surfaces to remove minor abrasion or rough portions. The polishing bur can polish any roughened surface to transform it into a smooth or mostly smooth surface. The bur can be attached to a handpiece that mechanically operates the bur, causing it to rotate, vibrate, or otherwise move to create the polishing effect. In some cases, it can be a high-speed instrument that rotates or vibrates the bur at a high speed for polishing. The bur can be used to polish different objects, such as jewelry, stones, keepsakes, among other objects. Similarly, the bur can be used to polish areas of the body, such as for dental polishing, nail polishing, skin polishing, etc. The bur is especially used for polishing in small spaces or crevices that require a narrow or small width, or slender polishing tip.

In one embodiment, the bur is an interproximal polishing bur for polishing teeth, especially for polishing in between teeth. The interproximal or interdental area is the gap that exists between teeth and that is occupied partially by the gums. Interproximal spaces commonly facilitate the appearance and accumulation of oral biofilm (bacterial plaque), as they are hard to clean even when teeth are in a normal position. Thus, the interproximal location of the teeth is a difficult area to reach for effective cleaning or treatment by a dental practitioner. For the purpose of illustration, the polishing bur will be described throughout for polishing teeth, especially the interproximal space. However, the bur can be used for polishing any surface.

Overview of Dental Crown Procedure

Figure 1:
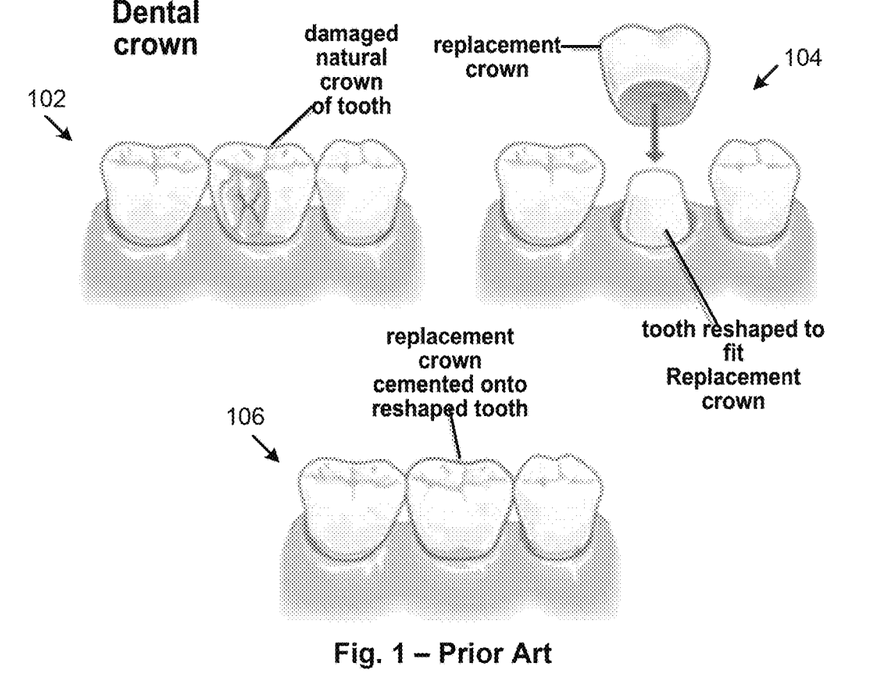
FIG. 1 shows a diagram of the steps involved in dental crown placement.

FIG. 1 illustrates a conventional dental crown procedure. In step 102, a damaged natural crown of a tooth is shown. In step 104, the tooth with the damage has been re-shaped so that the replacement crown can fit over the tooth. In the re-shaping process, an instrument is used to file down or remove material from the tooth such that the tooth is reduced in size, including a reduction in width, height, circumference, etc. The re-shaping instrument can include a handpiece and a tip, where the tip is coated with or has embedded in it an abrasive material, such as diamond particles. The abrasive tip attached to the handpiece rotates or moves to abrade the tooth and re-shape it for the crown. Step 106 of FIG. 1 shows the replacement crown cemented onto the re-shaped tooth.

Figure 2:
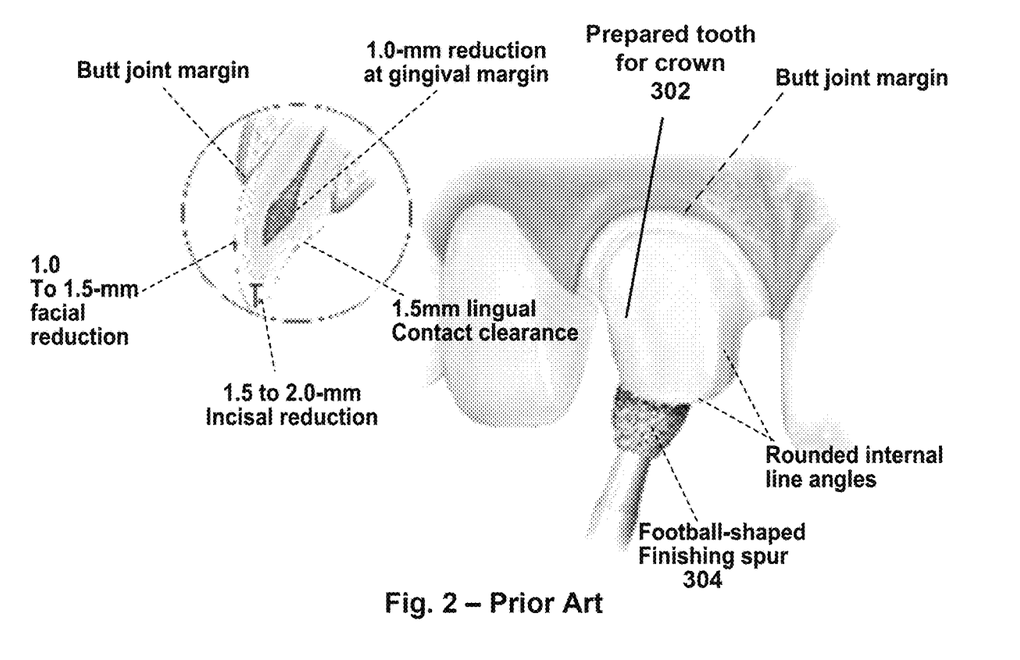
FIG. 2 illustrates the use of a football-shaped finishing bur for preparing/finishing a tooth for a crown.

FIG. 2 illustrates the use of a football-shaped finishing bur 304 for preparing/finishing a tooth 302 for a crown. This finishing bur 304 can be impregnated with diamond or other materials that cause it to be abrasive. The bur 304 creates rounded internal line angles in the preparation of the tooth. The margin of the tooth at the gum line is the butt joint margin. The figure illustrates the reductions that can occur at various locations of the tooth, including facial reduction, incisal reduction, gingival margin reduction, and it also shows the lingual contact clearance.

Due to the size and shape of the football-shaped finishing bur 304, it contacts the adjacent tooth on one or both sides of the prepared tooth 302 during the preparation process. As the bur is used to file down the tooth 302 that is being prepared, it must be placed very close to the adjacent teeth, resulting in the abrasive surface of the bur nicking the adjacent teeth. Since the bur is fairly wide, it cannot fit in the space between the teeth without contacting both teeth during its use. This roughened or nicked surface of the adjacent tooth/teeth will attract more bacteria and can be harmful to the health of the dentition. Presently, there are no polishing instruments or burs slender enough to fit into the small space available between the prepared tooth for the crown and the adjacent tooth.

Figure 3:
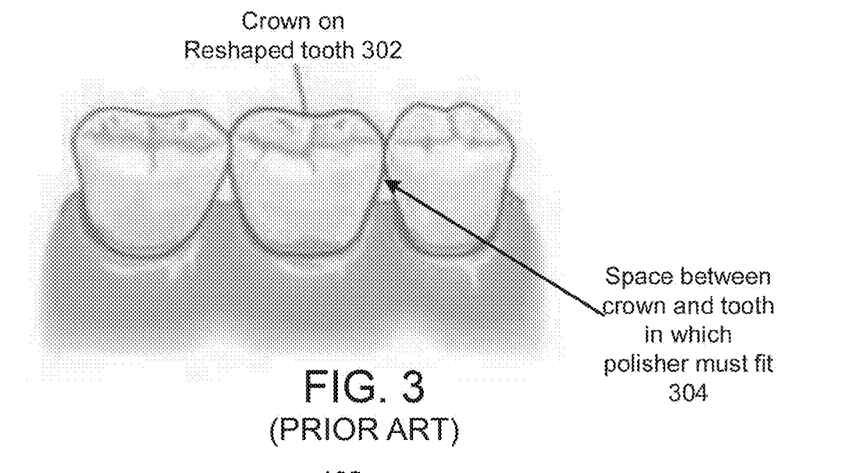
FIG. 3 illustrates the space between teeth into which a polishing bur must fit.

FIG. 3 illustrates the interproximal space 404 between teeth into which a polishing instrument must fit. Specifically, this is the crevice/space 404 between the crown on the re-shaped tooth 402 and the adjacent tooth. The adjacent tooth can be a natural tooth, or can be a crown or other tooth structure.

Figure 4:
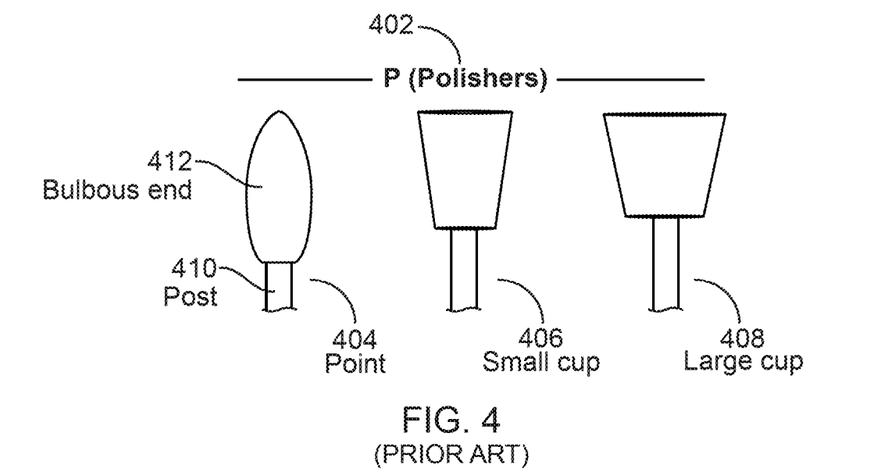
FIG. 4 shows an illustration of prior art polishing tips.

FIG. 4 shows an illustration of prior art polishing tips or polishers 402. The figure illustrates a point 404 (or football shape), a small cup 406, and a large cup 408. There can be various other shapes, such as disks or wheels, etc. Each shape, however, has a width that is wider than the crevice between teeth. In each example in FIG. 4, the post 410 is substantially narrower in width than the end. The point 404, for example, has a bulbous end 412 that is wider than the post. At its widest location in the middle of the bulbous end 412, the end appears to be more than double the width of the point. The circumference of the bulbous end 412 is substantially larger than the circumference of the port 410. With the small cup 406 and the large cup 408, the situation is even worse, as these have ends that appear even wider at their widest locations than the point 404. To use these polishers, dental practitioners must file or shave down the bulbous end or the cup end. However, it is difficult to do this evenly around the circumference of the device, resulting in an uneven polisher that may not be very effective at smoothing the surface of the tooth. Similarly, the shaving may result in the tip breaking or becoming damaged to the point that it can no longer be used. In addition, the shaving is very time consuming for the dentist or the dentist's team, resulting in delays in the crown placement procedure.

Figure 5:
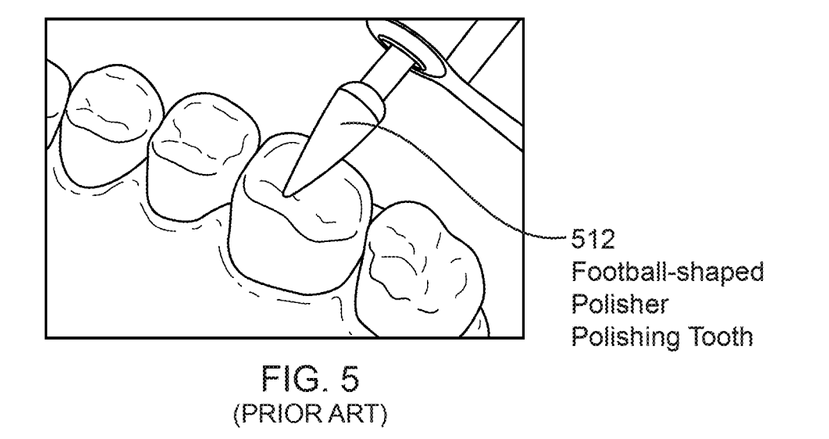
FIG. 5 illustrates a football-shaped polisher polishing a tooth.

FIG. 5 illustrates a football shaped polisher 612 polishing a tooth. As can be seen in the figure, the polisher is substantially wider than the space between teeth, and cannot fit in all of the locations needed to complete the polishing without manual adjustment to the polisher 612.

Figure 6:
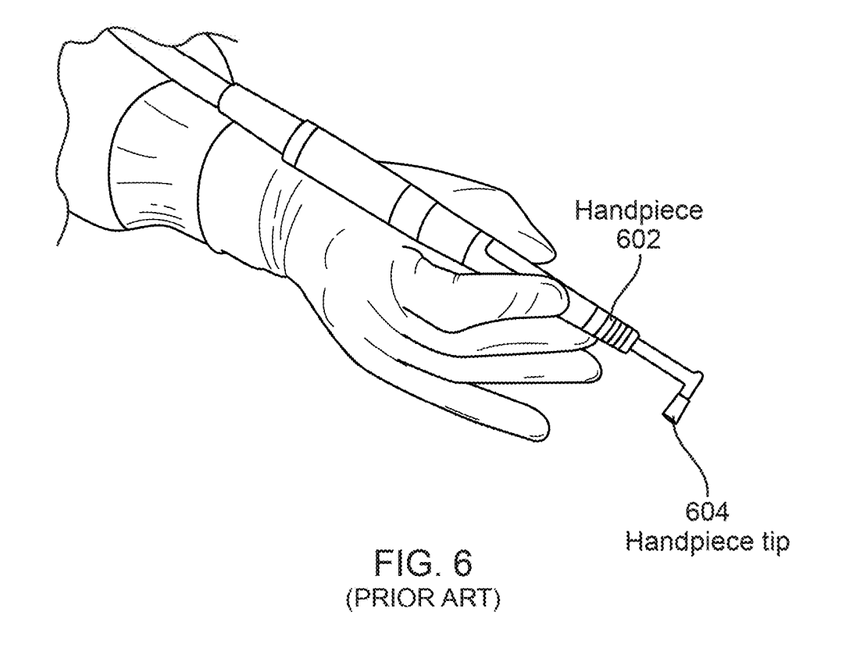
FIG. 6 illustrates a handpiece used with various different dental tips.

FIG. 6 illustrates a handpiece 502 used with various different dental handpiece tips 504. The handpiece 502 can be a high-speed instrument that contains a motor and internal gears to operate the tip. The tip 504 can rotate or vibrate in a high speed manner to allow the tip 504 to polish a tooth. The dentist grasps the proximal end of the handpiece as shown, and the tip 504 is attached at the distal end. The tip can be removed and replaced with a new tip 504 following use. FIG. 6 illustrates just one example of a handpiece with which the polishing bur can be used. The bur can be attached to the distal end of the handpiece in the manner shown for handpiece tip 504. The polishing bur can rotate, vibrate, or otherwise move upon operation of the handpiece.

Figure 7:
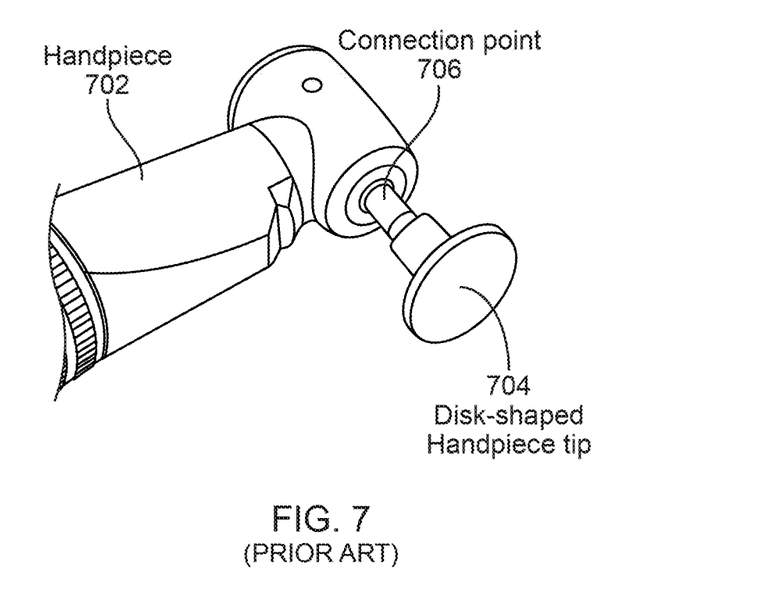
FIG. 7 illustrates an end of a handpiece with a polishing tip.

FIG. 7 illustrates an end of a handpiece 602 with a polishing tip 604. This is a larger view of a handpiece 602, specifically the distal end of the handpiece. The tip is a disk-shaped handpiece tip 604. The figure illustrates the connection point 610 at which the tip is inserted into the handpiece to connect to the internal handpiece components for operation.

The Polishing Bur

Figure 8A:
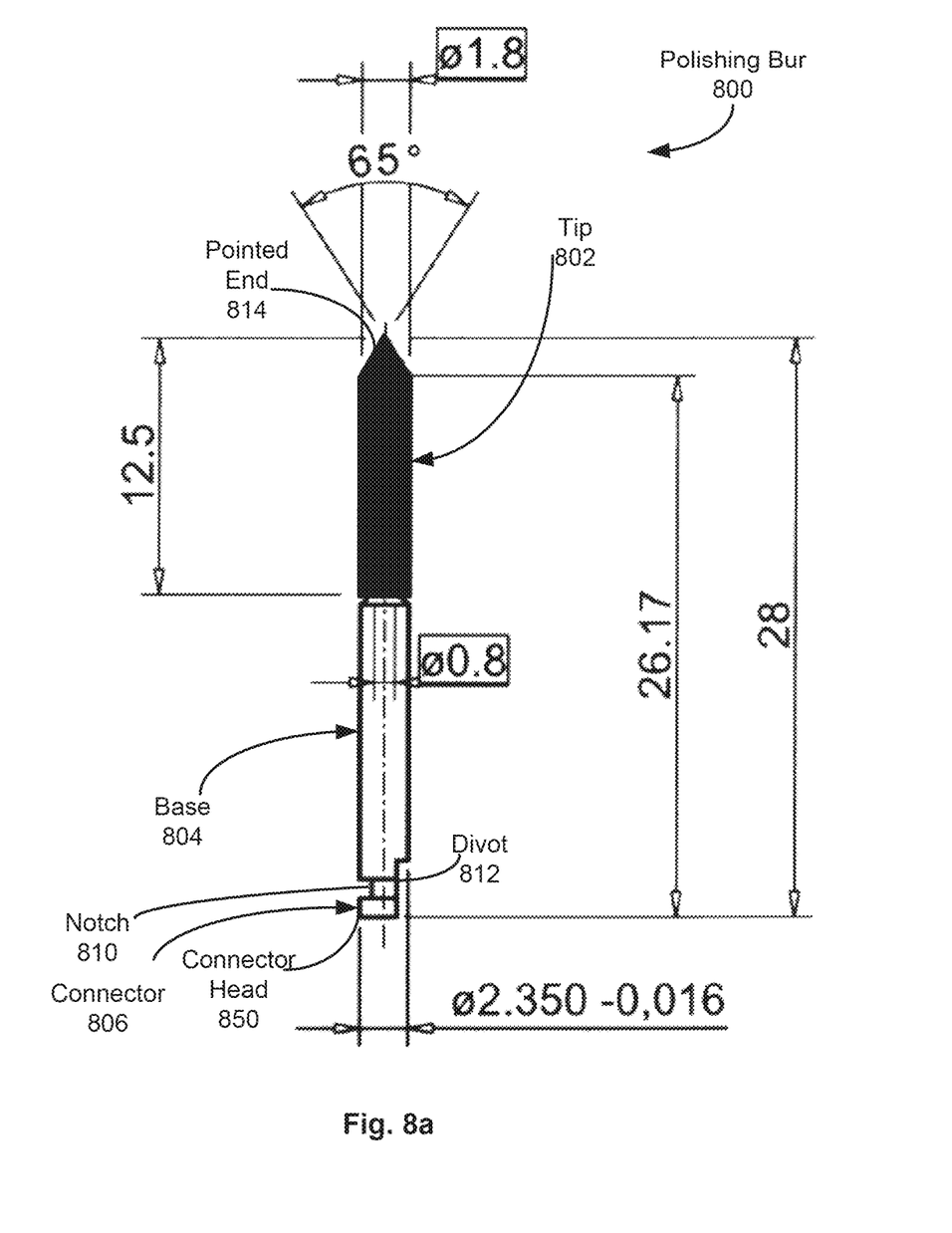
FIG. 8a is a diagram of a right side view of a polishing bur, according to an embodiment.

FIG. 8a is a diagram of a right side view of a polishing bur 800, according to an embodiment. The bur 800 includes a tip 802, a base 804, a connector 806, a pointed end 814 of the tip 802, a divot 812 in the connector/base, and a notch 810 in the connector. Different embodiments may have other designs or have different components. Example measurements are shown in the figure for illustration only, and other measurements may be used for any of the components of the bur in other embodiments.

As shown in FIG. 8a, the width of the tip 802 of the bur 800 is the same as or nearly the same as the width of the base 804. The tip 802 is composed of a pliable or deformable material, such as a polymer (e.g., rubber, bendable plastic, shape memory alloys, etc.). The base 804 is composed of a solid, sturdy material, such as metal, hard polymers or plastics, or other solid support materials. In one example, the tip 802 is composed of natural or synthetic rubber (with a metal support or shank inside) and the base 804 is composed of metal.

The bur has a pointed end 814 in this embodiment that is tapered such that it can fit in narrow spaces, such as between teeth. The tapered end in the embodiment of FIG. 8a (also shown in FIG. 11a as the tapered end 1150) is generally conical-shaped that has a point at one end (pointed end 814), which may be a dull or rounded point, and then the tip flares outward from that point to form a tip base (see FIG. 11a, tip base 1152) that is generally circular. In other words, from the circular tip base 1152, the tapered end 1150 of the tip 802 tapers inward to the pointed end 814. Different shapes of the tapered end 1150 or pointed end 814 can be used, such as a longer end that tapers more gradually. In some embodiments, other shapes are used for the tapered end 1150 or pointed end 814, including shapes with no point, with a square end, with a rounded end, etc.

The tip 802 also includes an elongated portion (see FIG. 11a, elongated tip portion 1154) that extends from the tapered end 1150 of the tip 802 to the base 804, and specifically to the junction (see FIG. 11a, junction 1102) between the tip 802 and the base 804. This elongated tip portion 1154 is cylindrical in shape according to some embodiments and connects directly to the tapered end 1150. These two portions can be a single piece. This elongated tip portion 1154 is generally the same width as the base or slightly smaller in width. The elongated tip portion 1154 and base 804 can both be cylindrical and can form a continuous cylinder, or the base can be slightly wider than the tip 802 such that there is a slight lip or junction 1102 between the two. Because the tip 802 is slim in width similar to the base 804, it can slip between the teeth of the patient as needed. The tip 802 overall can be generally the same length as the base 804. Other shapes of the elongated tip portion 1154 are also possible, such as conical, square or rectangular such that there are edges running along its length, etc.

The bur has a connector 806 that is used to connect the bur to a handpiece, such as that shown in FIG. 5. In some embodiments, a handpiece is custom-designed to fit the bur. In other embodiments, the bur is used with existing handpieces. The connector 806 can be generally cylindrical in shape. The connector 806 has a notch 810 that is present around the circumference of the connector, and a connector head 850 at the base of the connector immediately adjacent the notch. The connector head is the generally bulbous or protruding component or portion of the connector that is first inserted into a handpiece. The connector head 850 can be the same general width as the base, and can be cylindrical or round in shape. The notch 801 can be also cylindrical and can essentially be a cylinder of smaller width than the base and the connector head. The connector and the base can be one piece, such as one piece of metal or one molded piece of plastic, though they can also be separate pieces that are connected. The bur can also have a divot 812 on one or both sides. The divot is a flattened portion of the connector and a small part of the base. This flattened portion cuts into the cylindrical shapes of the connector head, notch, and base such that these only form partial cylinders are the area where the divot is present. The divot can extend along the entire width of the connector head, notch, and base. It can create a sharp right angle at the base just above the connector, where the base forms back into a full cylinder shape. The side view in FIG. 8a shows the side of the divot 812. The notch 810 and divot 812 allow the bur to connect inside the handpiece to the internal handpiece components that drive the movement of the bur 800.

Figure 8B:
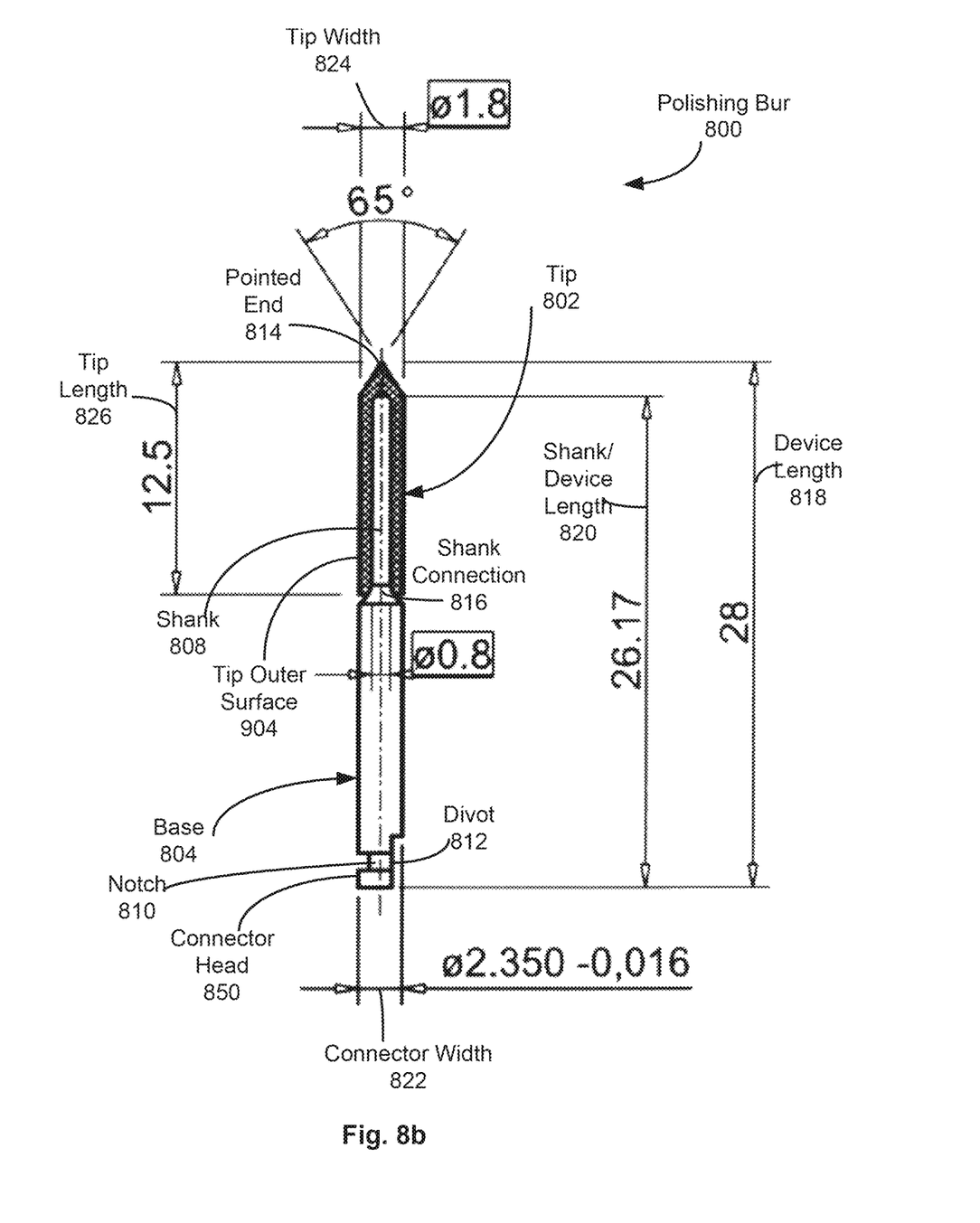
FIG. 8b is a diagram of a cross section of a right side view of the polishing bur, according to an embodiment.

FIG. 8b is a diagram of a cross-section of a right side view of the polishing bur 800, according to an embodiment. The cross section also illustrates the elongated shank 808 inside the tip 802. The shank 808 connects to the base via shank connection 816. The shank connection 816 flares outward from the shank 808 to connect the shank 808 to the base. The shank connection 816, in some embodiments, is generally conically shaped, with the top of the cone forming into the shank 808 that extends from the cone, though other shapes are also possible, such as cylindrical, square, or rectangular.

FIG. 8b also shows the tip outer surface 904 that can be composed of a pliant material such as rubber. This outer covering allows the tip 802 to be somewhat pliant such that it can readily fit into the interproximal space between teeth. The elongated shank 808 can be composed of a strong material, such as metal, that acts as support for the tip 802 and ensures that it maintains its structure and does not bend during polishing of the teeth. The shank connection 816, along with base 804 and the connection 806, can be composed of the same material or a different material. In one embodiment, the shank 808, shank connection 816, base 804, and connector 806 are formed of a single piece metal, though they can also be separate pieces of metal that are connected. The tip outer surface 904 surrounds the shank 808 such that the shank runs through the center of tip 802 or near to the center. Like the tip 802, the shank 808 is slim in width allowing the tip 802 to be well supported by the shank 808 while still being slim enough to fit into spaces between and around teeth.

The device or bur 800 can have various different shapes and sizes for each of its components. In one example, the bur has a device length 818 of 28 mm from the pointed end 814 to the end of the connector 806. In another example, the bur has a device length 818 of 22 mm from the pointed end 814 to the end of the connector 806, or has a length of 22 mm or less or 22 mm or more. Though the range can vary from 10 to 40 mm, especially 20 to 30 mm, or 27 to 29 mm or 21 to 23 mm (or any sub-ranges within these ranges, or whole or fractional numbers within these ranges). The shank/device length 820 that runs from the tip of the shank to the end of the connector can be 26 mm (e.g., 26.17 mm). Though the range can vary from 10 to 40 mm, especially 20 to 30 mm, or 25 to 27 mm (or any sub-ranges within these ranges, or whole or fractional numbers within these ranges). The tip width 824 or width of tip 802 can be 1.8 mm in one example. Though the range can vary from 0.1 to 5 mm, especially 0.5 to 3 mm, or 1 to 2.5 mm (or any sub-ranges within these ranges, or whole or fractional numbers within these ranges). For example, the tip 802 can have a width or diameter below 2 mm or below 1.9 mm, or in some cases below 1.5 mm. The tip 826 can have a tip length 826 that is 12.5 mm in one example. Though the range can vary from 5 to 20 mm, especially 10 to 15 mm, or 12 to 13 mm (or any sub-ranges within these ranges, or whole or fractional numbers within these ranges). The connector width 822 or width of the connector 806 from side to side can be 2.350 mm (e.g., +/−0.016 mm) in one example. Though the range can vary from 0.1 to 5 mm, especially 0.5 to 3.5 mm, or 1.5 to 2.5 mm (or any sub-ranges within these ranges, or whole or fractional numbers within these ranges).

Figures 9A, 9B:
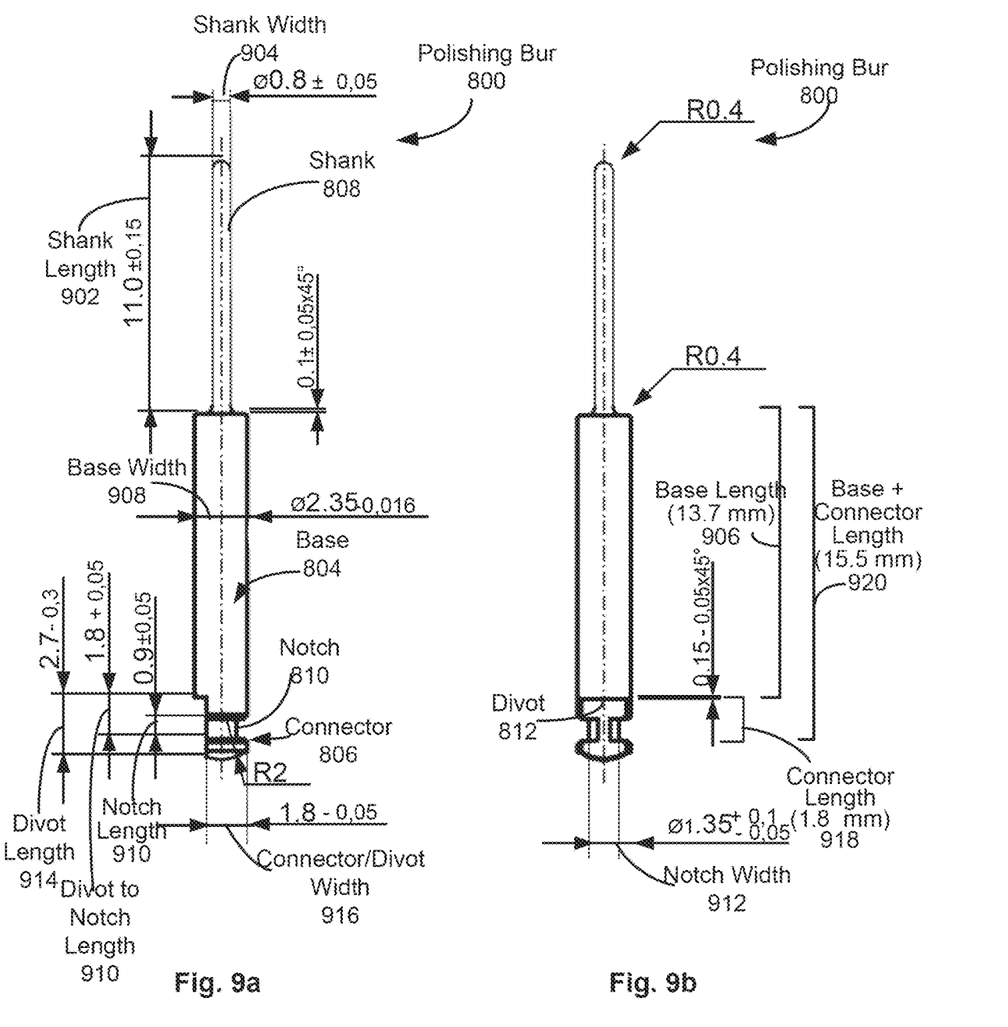
FIG. 9a is a diagram of a left side view of the polishing bur without an outer covering around a shank, according to an embodiment.
FIG. 9b is a diagram of a front view of the polishing bur without the outer covering around the shank, according to an embodiment.

FIG. 9a is a diagram of a left side view of the polishing bur 800 but with the outer covering around the shank removed for illustration, according to an embodiment. This diagram further shows the shank width 904 and shank length 902. The width 904 of the shank can be 0.8 mm (+/−0.05 mm) in one embodiment. Though the range can vary from 0.1 to 3 mm, especially 0.5 to 2 mm, or 0.7 to 0.9 mm (or any sub-ranges within these ranges, or whole or fractional numbers within these ranges). In one example, the shank width 904 is less than 1 mm or less than 0.9 mm or less than 0.7 mm. The width is generally as small as possible while still being large enough to provide the necessary support to the tip to prevent breakage or bending of the tip. The shank length can be 11 mm (+/−0.15 mm) in one embodiment or approximately 13.5 mm in another embodiment. It can also be 13.5 mm or less or 13.5 or more. Though the range can vary from 5 to 20 mm, especially 8 to 14 mm, or 10 to 12 mm or from 12 to 14 mm (or any sub-ranges within these ranges, or whole or fractional numbers within these ranges). The length of the shank can be selected such that the shank is long enough to allow the tip to reach the entire interproximal space, while still not being so long as to be weak and likely to break or otherwise sustain damage during use. The base width 908 can be 2.35 mm (+/−0.016 mm) in one example. Though the range can vary from 0.1 to 5 mm, especially 0.5 to 3 mm, or 1 to 2.5 mm (or any sub-ranges within these ranges, or whole or fractional numbers within these ranges).

FIG. 9a has a notch length 910 or length from the top to bottom of the notch 810 of 0.9 mm (+/−0.05 mm) in one embodiment. Though the range can vary from 0.1 to 1.5 mm, especially 0.5 to 1.2 mm, or 0.8 to 1 mm (or any sub-ranges within these ranges, or whole or fractional numbers within these ranges). The divot to notch length 910 from the top of the divot 812 to the bottom of the notch 810 can be 1.8 mm (+/−0.05 mm). Though the range can vary from 0.5 to 2.5 mm, especially 0.8 to 2.3 mm, or 1.7 to 1.9 mm (or any sub-ranges within these ranges, or whole or fractional numbers within these ranges). The divot length 914 from top to bottom of the divot 812 can be 2.7 mm (+/−0.3 mm). Though the range can vary from 0.5 to 4 mm, especially 1 to 3 mm, or 2.6 to 2.8 mm (or any sub-ranges within these ranges, or whole or fractional numbers within these ranges). The connector/divot width 916 from the divot 812 to the edge of the connector 806 can be 1.8 mm (+/−0.05 mm). Though the range can vary from 0.5 to 2.5 mm, especially 0.8 to 2.3 mm, or 1.7 to 1.9 mm (or any sub-ranges within these ranges, or whole or fractional numbers within these ranges).

FIG. 9b is a diagram of a front view of the polishing bur 800 without the outer covering around the shank for illustration, according to an embodiment. This view shows the divot 812 from the front side including the portion of the divot that cuts into the base at the top of the divot 812. The notch width 912, which is the width of the notch from side to side in this view can be 1.35 mm (+0.1 mm/−0.05 mm). Though the range can vary from 0.5 to 2 mm, especially 0.8 to 1.8 mm, or 1.3 to 1.45 mm (or any sub-ranges within these ranges, or whole or fractional numbers within these ranges). The base+connector length 920, which is the length from the top of the base 804 to the bottom of the connector 806 can be 15.5 mm. Though the range can vary from 5 to 30 mm, especially 10 to 20 mm, or 15 to 16 mm (or any sub-ranges within these ranges, or whole or fractional numbers within these ranges). The connector length 918 from the top of the connector (where it meets the base) to the bottom of the connector can be 1.8 mm. Though the range can vary from 0.5 to 2.5 mm, especially 0.8 to 2.3 mm, or 1.7 to 1.9 mm (or any sub-ranges within these ranges, or whole or fractional numbers within these ranges). The base length 906 or length of the base from where it meets the shank at the top to where it meets the connector at the bottom can be 13.7 mm. Though the range can vary from 1 to 25 mm, especially 10 to 16 mm, or 12 to 14 mm (or any sub-ranges within these ranges, or whole or fractional numbers within these ranges). The radius of the shank can be 0.4 mm (or another amount that corresponds to the shank widths 904 described above) along its length, though the radius can vary along the length too. It can be greater at the proximal end closest to the base such that the shank is wider at the proximal end than at the distal end.

The bur 800 can be cylindrical with rounded edges along its length though can take other shapes including having edges along its length. The tip 802 is shown as cylindrical, but similarly the tip can take on shapes that are the same as or different from the base, including having edges along the length. The shank 904 is also shown as cylindrical but can take on shapes that are the same as or different from the tip and/or the base, including having edges along the length. The tip 802 can be a uniform width along its length or the width can vary. For example, the tip 802 can taper along its length to a narrower width. It can taper uniformly along its length or can taper to a point more quickly at the distal end such that there is a more slender portion at the distal end than at the proximal end. The shank may taper in the same manner as the tip or can have a uniform width along its length. Either the tip or the shank can also taper in the opposite direction such that one or both of them becomes wider at the distal end relative to the proximal end, or either can have a varying width along the length (e.g., narrowest at the distal and proximal ends, and wider in between).

Figure 10:
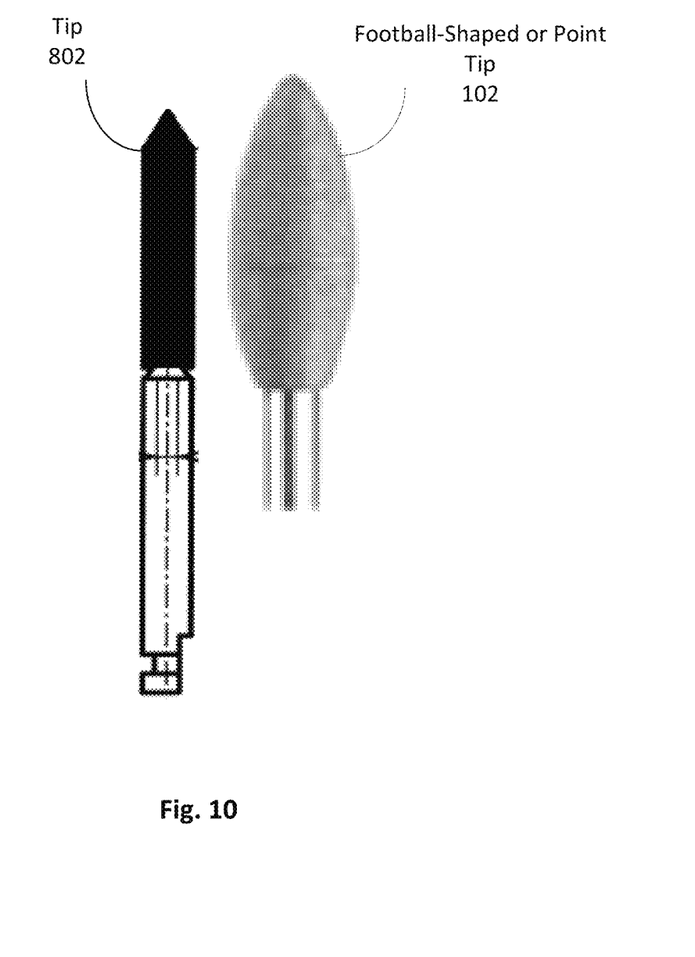
FIG. 10 illustrates the polishing bur from the diagram of FIG. 8a compared next to the football shaped conventional tip of FIG. 4.

FIG. 10 illustrates the bur 800 of FIG. 8a showing tip 802 next to an enlarged image of the conventional tip 104 (the point or football shaped tip) from FIG. 4. The conventional polisher shape 104 is generally an oval or football shape that has the smallest width at the distal end and the widest width in the middle between the proximal and distal ends. The figure illustrates that the conventional shape 104 is much wider than the shape of the tip 802 of the bur 800 along its length, especially at the widest part in the middle of shape 104. The conventional shape 104 is also much wider than the base 804.

In contrast, bur 800 is designed such that the tip 802 can be the same or similar width as the base 804. They can be exactly the same width, or they can vary in width between them, with one being slightly larger than the other (e.g., 0.1 mm, 0.5 mm, 1 mm, 2 mm, etc. difference in width between them). In some embodiments, the tip 802 of bur 800 is longer than conventional tips. In some embodiments, the shank 802 of bur 800 is longer relative to the rest of the tip 802 in comparison to any support that might be present in other tips relative to the overall length of the other tips. In some embodiments, the tip 802 and the base 804 of bur 800 are the same length or near to the same length, though one can be longer than the other.

Figures 11A, 11C:
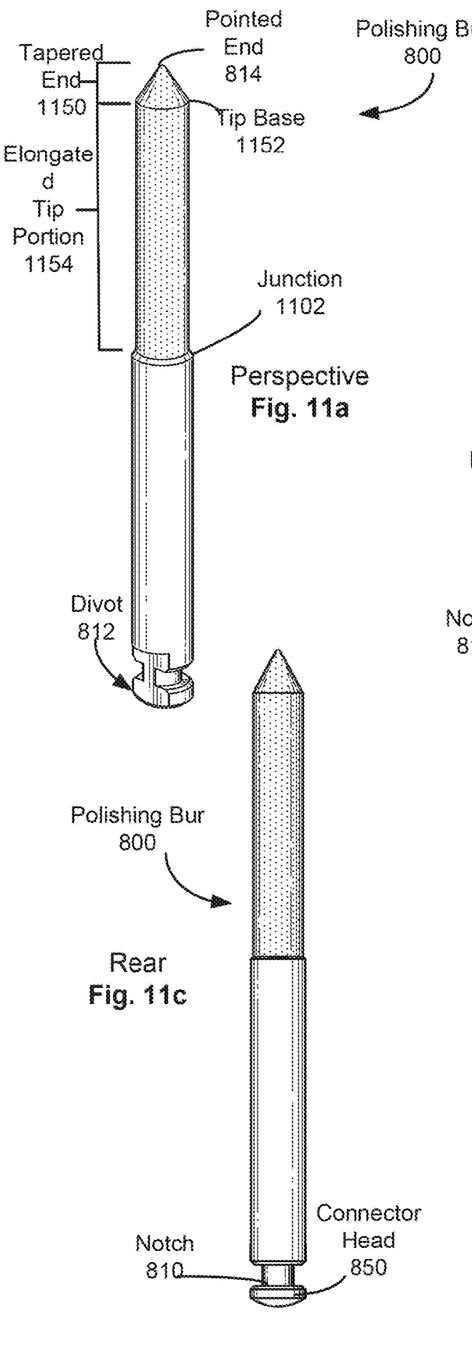
FIG. 11a illustrates the polishing bur in a right side perspective view, according to an embodiment.
FIG. 11c illustrates the polishing bur in a rear view, according to an embodiment.
Figures 11B, 11D:
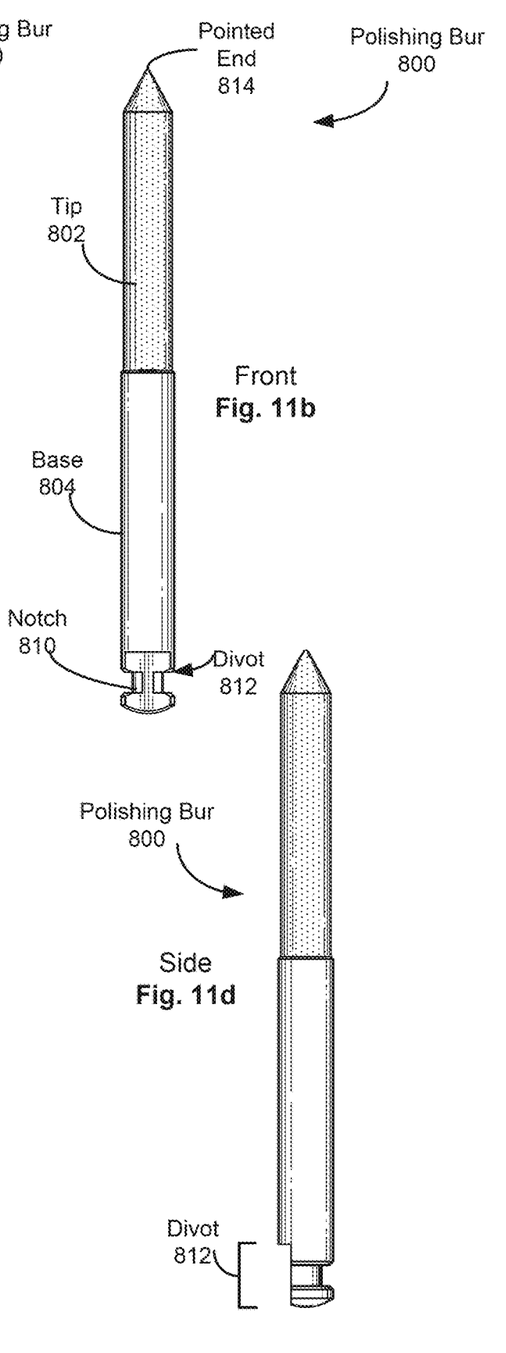
FIG. 11b illustrates the polishing bur in a front view, according to an embodiment.
FIG. 11d illustrates the polishing bur in a right side view, according to an embodiment.

FIG. 11 illustrates different views of the bur 800 from above. FIG. 11a illustrates a right side perspective view of the bur 800 in which the divot 812 in the connector is readily visible. FIG. 11b shows a front view while FIG. 11c shows a rear or back view in which the divot 812 is hidden from view on the other side of the bur. FIG. 11d shows a side view illustrating the outline of the divot 812. In these views, the notch 810 is also generally visible, as is the connector head 850. The tip 802 is shown as the shaded portion, and is composed of a flexible material, such as rubber. The perspective view of FIG. 11a illustrates that the tip 802 is generally close in width to the base 804. The tip is thin enough to fit into the spaces between teeth while not being so thin as to be at risk of breakage. The tip 802 also includes a tapered end 1150 that has a tip base 1152 that tapers to the pointed end 814, and an elongated tip portion 1154 extending between the junction 1102 and the tip base 1152

The junction 1102 between the tip 802 and the base 804 is also illustrated in FIGS. 11a-d. It can be formed such that the base extends directly out from the tip around its circumference to form a right angle relative to the tip, or the junction 1102 can include a sloped surface that gradually extends from out from the tip. In some embodiments, the tip and the base form a smooth continuous line and are exactly the same size, such that the junction 1102 is merely the meeting point between the two.

As explained above, the tip 802 can have various different lengths and shapes. It can have a decreasing width closer to the pointed end 814, such that the distal-most point or the pointed end 814 is smaller to fit into especially narrow spaces. The decrease in width of the tip 802 can be constant along the length of the tip or can vary at different points along the length. The pointed end 814 is shown as conical, but can also take on various shapes, included being rounded, square, irregularly-shaped, etc. The end 814 can also have a longer or shorter cone-shape than is shown, and can come to a more sharp or more dull point.

FIG. 12 illustrates the bur 800 connected to a handpiece 1202. Various different handpieces can be used, so this is just one example. As is shown, a portion of the base 804, specifically the connector portion 806, is within the head 1204 of the handpiece. In some embodiments, a portion of the 804 base above the connector portion is also within the handpiece to hold the bur 800 in place. A connector can attach inside the handpiece in various ways, for example, by clicking into a mechanical structure or connection mate that engages the connector head 850 and locks in at the notch 810 of the connector. The bur 800 can be fairly easily pulled into and out of the handpiece by the user, while still engaging the connection made inside the handpiece sufficiently tightly to hold the bur 800 in place during user. The body 1206 of the handpiece 1202 extends from the end and can be grasped by the user or dental practitioner for use of the handpiece in polishing surfaces.

Figure 12A:
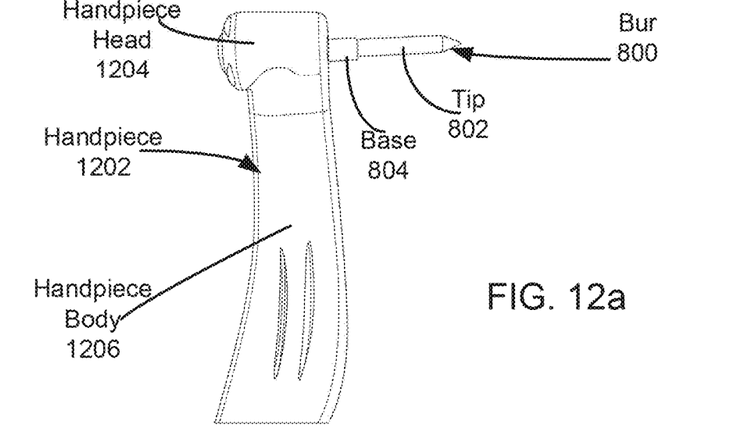
FIG. 12a illustrates the polishing bur attached to a handpiece, according to an embodiment.
Figure 12B:
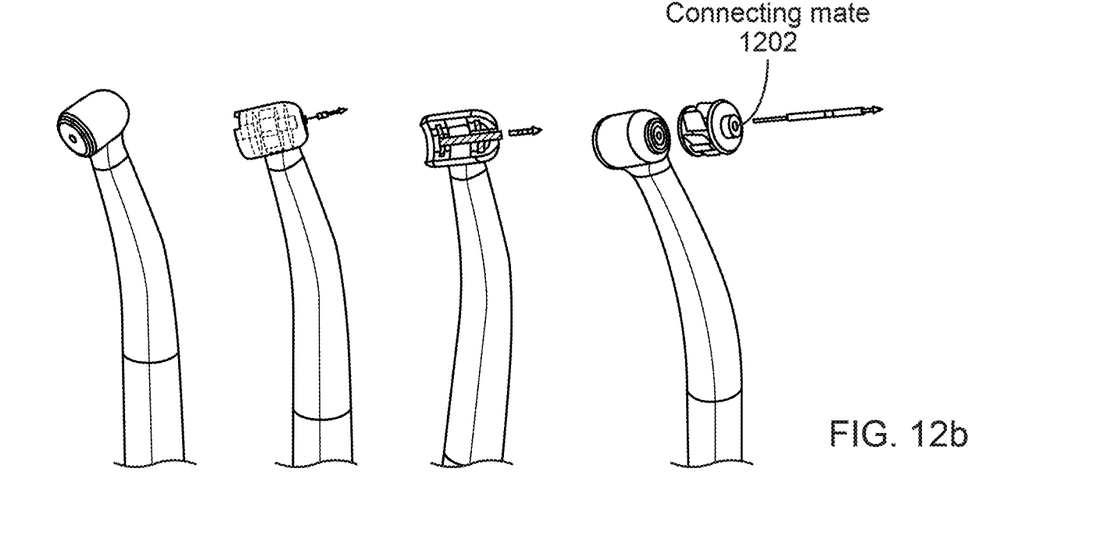
FIG. 12b illustrates attachment of a bur to a handpiece and the internal components of a handpiece head.
Figure 12C:
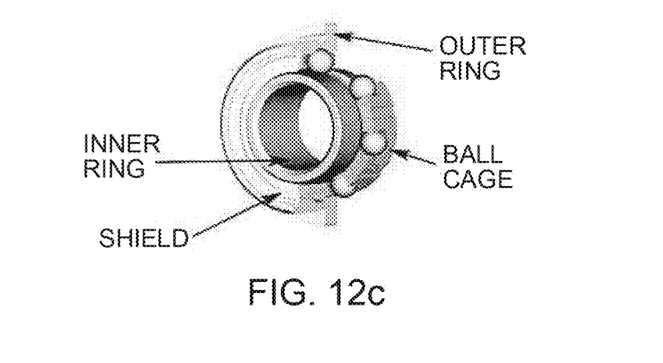
FIG. 12c illustrates a ball bearing design that can be inside a handpiece.
Figure 12D:
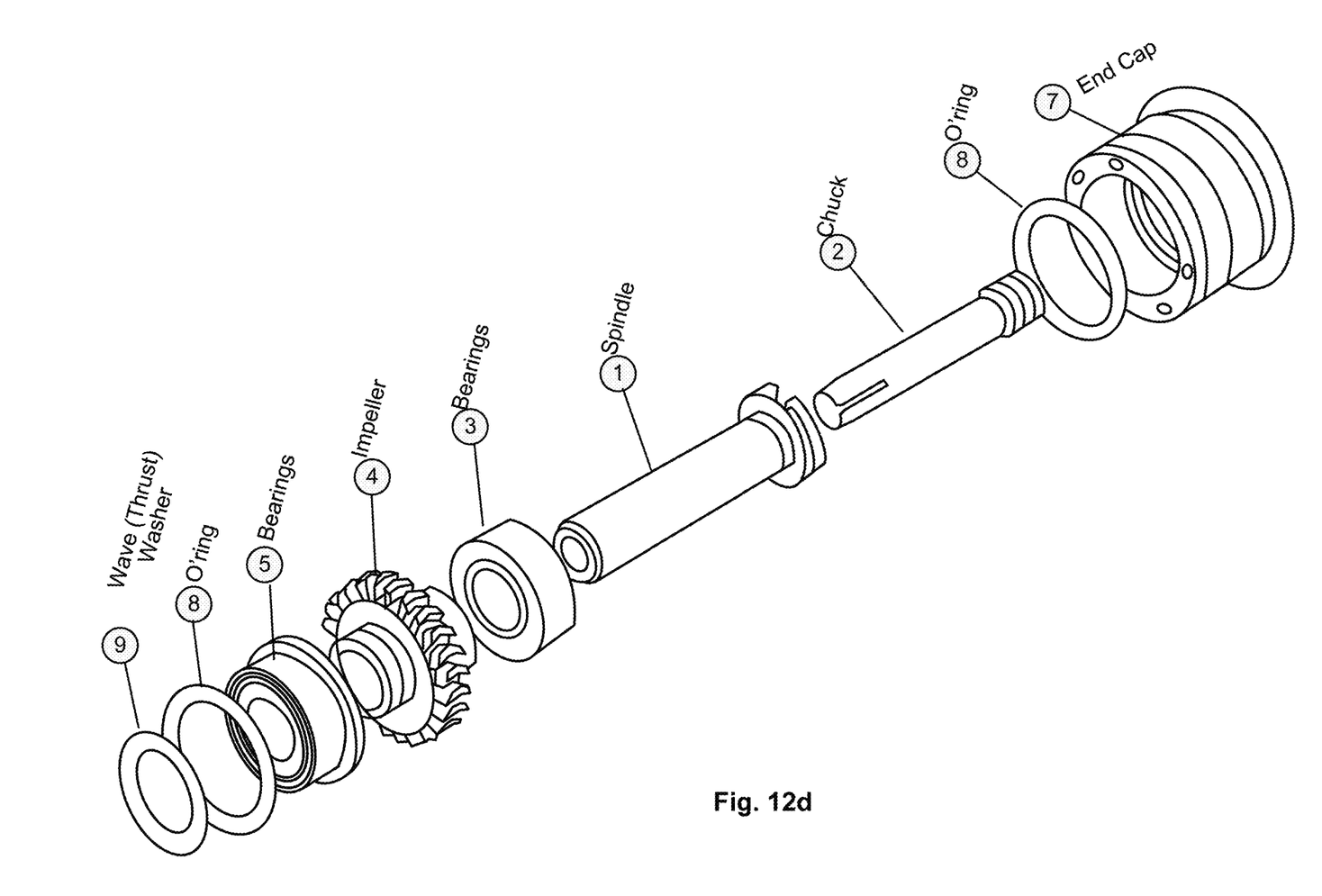
FIG. 12d provides an exploded view of a turbine design that can be inside a handpiece.

FIGS. 12b, 12c, and 12d show illustrations of attachment of tips or burs to a handpiece and possible internal constructions of the internal components of the handpiece 1202. FIG. 12b shows across various views the attachment of a handpiece to a connecting mate 1202 that is inside the handpiece head. FIG. 12c shows a ball bearing design with an outer and inner ring, shield, and ball cage and FIG. 12d shows an exploded view of a turbine design for rotating a bur. An impeller can catch the drive air that results in spinning of the turbine. More air caught by the impeller results in additional energy from the drive air being transferred into torque. The ball bearings reduce friction and these allow the turbine to rotate and hence spin the tip inserted in the handpiece.

OTHER CONSIDERATIONS

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the apparatus disclosed herein without departing from the spirit and scope defined in the appended claims.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

What is claimed is:

1. An interproximal polishing bur comprising:
a base of the bur having a base width;
a connector on the base forming a proximal end of the bur, the connector attachable to a handpiece for moving the bur to polish a tooth; and
a tip extending from the base to form a distal end of the bur, the tip having a tip width that is the same as or less than the base width along the length of the tip, the tip comprising:
an elongated shank positioned within the tip, the elongated shank having a shank connection connecting the elongated shank to the base of the bur, the elongated shank having a shank width, and
an outer covering surrounding the elongated shank, the outer covering comprising a pliant material around the elongated shank, wherein the outer covering forms:

a tapered end that tapers linearly inward to a point, wherein the shank width is constant from the shank connection up to the tapered end, wherein the shank width is less than or equal to half of the tip width.

2. The interproximal polishing bur of claim 1, wherein the tip has a tip length and the base has a base length, and the tip length is within 2 mm of the base length.

3. The interproximal polishing bur of claim 1, wherein the connector comprises a notch around a circumference of the connector.

4. The interproximal polishing bur of claim 1, wherein the connector and proximal end of the base comprise a divot that forms a flattened area for connection to and operation of the bur by the handpiece.

5. The interproximal polishing bur of claim 1, wherein the tip comprises an elongated portion that is cylindrical in shape and has a constant width along its length.

6. The interproximal polishing bur of claim 1, wherein the shank, the base, and connector are composed of metal.

7. The interproximal polishing bur of claim 1, wherein the tip width is 1.8 mm.

8. The interproximal polishing bur of claim 1, wherein the shank width is 0.8 mm.

9. The interproximal polishing bur of claim 1, wherein the shank length is 11 mm.

10. The interproximal polishing bur of claim 1, wherein the shank length is above 10 mm.

11. The interproximal polishing bur of claim 1, wherein the tip length is 12.5 mm.

12. The interproximal polishing bur of claim 1, wherein the tip length is above 12 mm.

13. The interproximal polishing bur of claim 1, wherein the tip width is below 2 mm.

14. The interproximal polishing bur of claim 1, wherein the tip and the base are cylindrical in shape and are connected by a junction, and wherein the shank extends from the base via the shank connection that tapers inward from the base to the shank.

15. The interproximal polishing bur of claim 1, wherein the shank, the base, and the connector are composed of metal, and the outer covering is composed of rubber that surrounds the shank.

16. The interproximal polishing bur of claim 1, wherein the shank, the base, and the connector are composed of metal, and the outer covering is composed of rubber, the outer covering surrounding the shank entirely, wherein the connector comprises a notch around the connector, wherein the connector and proximal end of the base comprise a divot forming a flattened portion of the connector.

17. The interproximal polishing bur of claim 1, wherein the shank has a shank length, and wherein the tip has a tip length, the tip length is 12 mm or more, the shank length is 11 mm or more, and the shank width is 0.8 mm or more.

18. The interproximal polishing bur of claim 1, wherein the outer covering around the shank has a thickness on one side of the shank and a thickness on an opposite side of the shank that added together is greater the shank width.

19. The interproximal polishing bur of claim 1, wherein the tip has an elongated portion that is cylindrical, and wherein the elongated portion plus the tapered end are longer than the shank, and wherein the tip is the same length and width as the base.

20. A method of using the interproximal polishing bur of claim 1, comprising:

inserting the polishing bur into the interproximal space between a crown placed on a tooth or a tooth prepared for a crown and an adjacent tooth; and polishing, with the tip of the polishing bur, a surface of the adjacent tooth that faces the interproximal space between the adjacent tooth and the crown.

* * * * *